United States Patent
Asghari et al.

(10) Patent No.: US 9,217,836 B2
(45) Date of Patent: Dec. 22, 2015

(54) EDGE COUPLING OF OPTICAL DEVICES

(71) Applicants: Mehdi Asghari, Pasadena, CA (US); Roshanak Shafiiha, La Canada-Flintridge, CA (US); Daniel C. Lee, Montclair, CA (US); Dazeng Feng, El Monte, CA (US); Xuezhe Zheng, San Diego, CA (US); Ashok Krishnamoorthy, San Diego, CA (US); Hiren Thacker, San Diego, CA (US); John E. Cunningham, San Diego, CA (US)

(72) Inventors: Mehdi Asghari, Pasadena, CA (US); Roshanak Shafiiha, La Canada-Flintridge, CA (US); Daniel C. Lee, Montclair, CA (US); Dazeng Feng, El Monte, CA (US); Xuezhe Zheng, San Diego, CA (US); Ashok Krishnamoorthy, San Diego, CA (US); Hiren Thacker, San Diego, CA (US); John E. Cunningham, San Diego, CA (US)

(73) Assignee: Kotura, Inc., Monterey Park, CA (US)

( * ) Notice: Subject to any disclaimer, the term of this patent is extended or adjusted under 35 U.S.C. 154(b) by 292 days.

(21) Appl. No.: 13/694,070

(22) Filed: Oct. 23, 2012

(65) Prior Publication Data

US 2014/0133864 A1    May 15, 2014

(51) Int. Cl.
G02B 6/42 (2006.01)

(52) U.S. Cl.
CPC ..................... *G02B 6/423* (2013.01)

(58) Field of Classification Search
None
See application file for complete search history.

(56) References Cited

U.S. PATENT DOCUMENTS

| | | | |
|---|---|---|---|
| 5,054,870 A * | 10/1991 | Losch et al. ............ | 385/14 |
| 5,321,786 A * | 6/1994 | Valette et al. ........... | 385/92 |
| 6,108,478 A | 8/2000 | Harpin et al. | |
| 6,118,917 A * | 9/2000 | Lee et al. ............ | 385/49 |
| 6,324,314 B1 * | 11/2001 | Ukechi et al. ........... | 385/14 |
| 6,442,315 B1 | 8/2002 | Rhee et al. | |
| 6,470,118 B1 * | 10/2002 | Uno ................ | 385/49 |
| 6,580,850 B1 | 6/2003 | Kazarinov et al. | |
| 6,643,434 B2 * | 11/2003 | Cayrefourcq et al. ....... | 385/52 |
| 6,669,801 B2 * | 12/2003 | Yoshimura et al. ......... | 156/230 |
| 6,760,520 B1 | 7/2004 | Medin et al. | |
| 7,492,984 B2 * | 2/2009 | Watanabe et al. .......... | 385/14 |
| 7,658,552 B2 * | 2/2010 | Asghari ............. | 385/89 |
| 7,663,210 B2 | 2/2010 | Karkkainen | |
| 8,594,477 B2 * | 11/2013 | Watanabe ............. | 385/129 |
| 8,805,129 B2 * | 8/2014 | Han et al. ............. | 385/14 |
| 2002/0064345 A1 * | 5/2002 | Kikuchi et al. ........... | 385/50 |
| 2003/0053756 A1 | 3/2003 | Lam et al. | |
| 2003/0081902 A1 | 5/2003 | Blauvelt et al. | |
| 2003/0205794 A1 * | 11/2003 | Lee et al. ............ | 257/678 |
| 2004/0247248 A1 * | 12/2004 | Fasham ............. | 385/52 |
| 2005/0207464 A1 * | 9/2005 | Blauvelt et al. ........... | 372/64 |
| 2007/0196049 A1 | 8/2007 | Gunn, III | |
| 2008/0056638 A1 | 3/2008 | Glebov et al. | |
| 2008/0226222 A1 * | 9/2008 | Kim et al. ............ | 385/14 |
| 2009/0324173 A1 | 12/2009 | Asghari et al. | |
| 2010/0209054 A1 * | 8/2010 | Hodono ............. | 385/88 |
| 2013/0209033 A1 | 8/2013 | Luff et al. | |

\* cited by examiner

*Primary Examiner* — Mike Stahl
(74) *Attorney, Agent, or Firm* — Gavrilovich, Dodd & Lindsey, LLP

(57) ABSTRACT

A system includes optical modules. Each module includes a different base and one or more module waveguides on the base. Module waveguides from different modules are aligned such that the aligned module waveguides exchange light signals. At least a portion of one of the aligned module waveguides is between the base of one of the modules and the base of another module. First electronics operate a transmitter on a first one of the optical modules so as to generate one of the light signals. Second electronics operate a receiver on a second one of the modules such that the electronics generate an electrical signal in response to the receiver receiving one of the light signals.

20 Claims, 13 Drawing Sheets

EDGE COUPLING OF OPTICAL DEVICES

GOVERNMENT LICENSE RIGHTS

This invention was made with Government support under Agreement No. HR0011-08-9-0001 awarded by DARPA. The Government has certain rights in this invention.

FIELD

The present invention relates to optical devices and more particularly to optically coupled devices.

BACKGROUND

Modern communications and computing applications often require that electrical signals be routed from one circuit board to another circuit board. This routing is typically done through wires or other electrical conductors. However, as the routing distance increases to the order of half a millimeter, the power requirements increase and the signal speed decreases. As a result, there is a need for systems that efficiently route signals between circuit boards that are separated from one another.

SUMMARY

A system includes optical modules. Each module includes a base and one or more module waveguides on the base. Module waveguides from different modules are aligned such that the aligned module waveguides exchange light signals. At least a portion of one of the aligned module waveguides is between the base of one of the modules and the base of another module. First electronics operate a transmitter on a first one of the optical modules so as to generate one of the light signals. Second electronics operate a receiver on a second one of the modules such that the electronics generate an electrical signal in response to the receiver receiving one of the light signals.

BRIEF DESCRIPTION OF THE FIGURES

FIG. 4A is a topview of the system.

FIG. 4B is a cross section of the system shown in FIG. 4A taken through a waveguide on the base device and the second waveguide on the auxiliary device.

DESCRIPTION

Figure 1A:
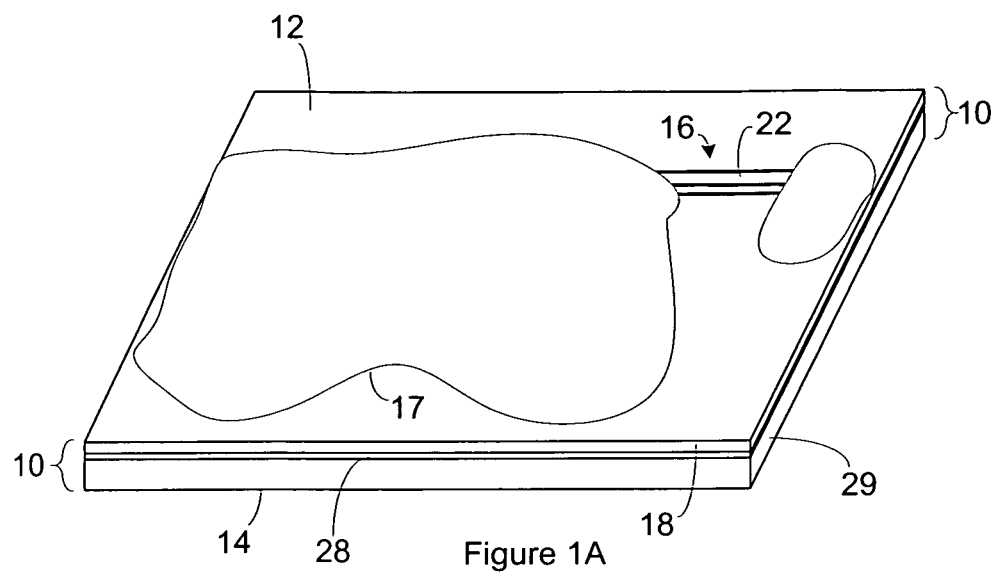
FIG. 1A is perspective view of an optical device that serves as a base device.

An optical system is constructed from multiple modules. At least a portion of the modules each has one or more waveguides that carry light signals to and/or from one or more optical components on the module. The modules include complementary alignment structures that allow different modules to be assembled in a way that aligns the waveguides from different modules such that the waveguides can exchange light signals. Optical components on different modules can be different from one another and can perform different functions. As a result, modules that can be assembled into an optical system that provides the desired functionality can be identified and assembled.

Assembling an optical system from modules allows different components to be fabricated separately from one another. It is often difficult and expensive to fabricate different components on the same wafer or device because of the uses of different materials and the range of possible features associated with the different components. The ability to fabricate the different components on different modules and then assemble them into a single optical system can reduce the costs and complexity associated with the fabrication process.

In some instances, the optical system is incorporated into an electrical system. For instance, first electronics can be located on a first circuit board that is external to the optical system and second electronics can be located on a first circuit board that is external to the optical system. The first electronics can be connected to the optical system so that the first electronics operate a first one of the components on a first one of the modules. Additionally, the second electronics can be connected to the optical system so that the second electronics operate a second one of the components on a second one of the modules. As a result, the first electronics and the second electronics can be external to the optical system and can operate components on different modules within the optical system.

In one example, the first electronics operate a transmitter on the first module and the second electronics operate a receiver on the second module. The first electronics can operate the transmitter so it generates a modulated light signal that includes data carried in an input electrical signal that was used to generate the modulated light signal. The modulated light signal can be routed through waveguides on none, one, or more than one of the other modules and then be received at the second module. The second module can guide the modulated light signal to the receiver. The second electronics can operate the receiver such that the receiver generates a modulated output electrical signal in response to the receiver receiving the modulated light signal. In some instances, the second electronics can process the modulated output electrical signal so as to recover the input electrical signal or so as to recover data that was carried in the input electrical signal. As a result, the data that was originally present on the first circuit board is communicated to the electronics on the second circuit board. As a result, the modular optical system provides an optical link for communicating data between electronics on different circuit boards.

Figure 1B:
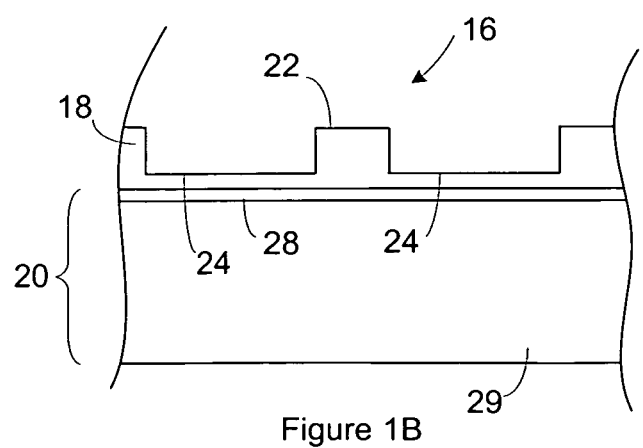
FIG. 1B is a cross section of the base device shown in FIG. 1A taken along the line labeled B in FIG. 1A.

FIG. 1A is perspective view of an optical device that serves as a base device. FIG. 1B is a cross section of the base device shown in FIG. 1A taken along the line labeled B in FIG. 1A. The base device is within the class of optical devices known as planar optical devices. Planar optical devices typically include one or more waveguides immobilized relative to a substrate or a base. The direction of propagation of light signals along the waveguides is generally parallel to a horizontal plane of the base device. Examples of a horizontal plane of the base device include the topside of the base, the bottom side of the base, the topside of the substrate, and/or the bottom side of the substrate.

The illustrated base device includes lateral sides 10 (or edges) extending from a topside 12 to a bottom side 14. The direction of propagation of light signals along the length of the waveguides on a planar optical device generally extends through the lateral sides 10 of the device. The topside 12 and the bottom side 14 of the base device are non-lateral sides.

The base device includes one or more first waveguides 16 that each guides light signals to and/or from optical components 17. Examples of optical components 17 that can be included on the base device include, but are not limited to, one or more components selected from a group consisting of facets through which light signals can enter and/or exit a waveguide, a taper for changing the mode size of a light signal guide by the waveguide, entry/exit ports through which light signals can enter and/or exit a waveguide from above or below the base device, multiplexers for combining multiple light signals onto a single waveguide, demultiplexers for separating multiple light signals such that different light signals are received on different waveguides, optical couplers, optical switches, lasers that act a source of a light signal, light sensors such as sensors that convert all or a portion of the light signal to an electrical signal, amplifiers for amplifying the intensity of a light signal, attenuators for attenuating the intensity of a light signal, modulators for modulating a signal onto a light signal, modulators that convert a light signal to an electrical signal, and vias that provide an optical pathway for a light signal traveling through the base device from the bottom side 14 of the base device to the top side 12 of the base device. Additionally, the base device can optionally include electrical components. For instance, the base device can include electrical connections for applying a potential or current to a waveguide and/or for controlling other components on the base device.

The first waveguide 16 is defined in a light-transmitting medium 18 positioned on a base 20. For instance, a portion of the first waveguide 16 is partially defined by a ridge 22 extending upward from a slab region of the light-transmitting medium 18 as shown in FIG. 1B. In some instances, the top of the slab region is defined by the bottom of trenches 24 extending partially into the light-transmitting medium 18 or through the light-transmitting medium 18. Suitable light-transmitting media include, but are not limited to, silicon, polymers, silica, SiN, GaAs, InP and LiNbO$_3$. One or more cladding layers (not shown) are optionally positioned on the light-transmitting medium 18. The one or more cladding layers can serve as a cladding for the first waveguide 16 and/or for the base device. When the light-transmitting medium 18 is silicon, suitable cladding layers include, but are not limited to, silicon, polymers, silica, SiN, GaAs, InP and LiNbO$_3$.

The portion of the base 20 adjacent to the light-transmitting medium 18 is configured to reflect light signals from the first waveguide 16 back into the first waveguide 16 in order to constrain light signals in the first waveguide 16. For instance, the portion of the base 20 adjacent to the light-transmitting medium 18 can be a light insulator 28 with a lower index of refraction than the light-transmitting medium 18. The drop in the index of refraction can cause reflection of a light signal from the light-transmitting medium 18 back into the light-transmitting medium 18. The base 20 can include the light insulator 28 positioned on a substrate 29. As will become evident below, the substrate 29 can be configured to transmit light signals. For instance, the substrate 29 can be constructed of a light-transmitting medium 18 that is different from the light-transmitting medium 18 or the same as the light-transmitting medium 18. In one example, the base device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serve as the light insulator 28 and the silicon substrate can serve as the substrate 29.

An auxiliary device is interfaced with the base device. Although the auxiliary device is shown as being centrally positioned on the base device, the auxiliary device can be positioned at or adjacent to an edge of the base device. The auxiliary device can exchange light signals with the base device. For instance, a second waveguide (not shown) on the auxiliary device can receive light signals from the first waveguide 16 on the base device and/or can guide light signals that are received by the first waveguide 16 on the base device.

The auxiliary device can generally be distinguished from the components 17 on the base device in that the auxiliary device is fabricated apart from the base device and is later attached to the base device. For instance, auxiliary devices are often attached to the base device through the use of solder bumps. In contrast, all or a portion of the components 17 are fabricated directly on the base device. As a result, all or a portion of the components 17 can incorporate portions of the chip or wafer from which the base device is fabricated, and/or can include materials grown directly or deposited directly onto the chip or wafer from which the base device is fabricated. An example of a component 17 that incorporates a portion of a chip is a modulator that uses the silica layer of a silicon-on-insulator wafer as a light insulator or a light sensor that uses a ridge formed in the silicon layer of the silicon-on-insulator wafer as a waveguide. An example of a component 17 that include materials grown directly or deposited directly onto the chip includes a modulator that uses germanium grown directly on the silicon of a silicon-on-insulator wafer as a light insulator.

In some instances, the auxiliary device is a planar optical device. Accordingly, in some instances, the auxiliary device includes optical components in addition to the second waveguide. The second waveguide can guide light signals to and/or from optical components on the auxiliary device. In one example, the auxiliary device excludes optical components other than the second waveguide. In another example, the auxiliary device excludes optical components other than the second waveguide.

Figure 2:
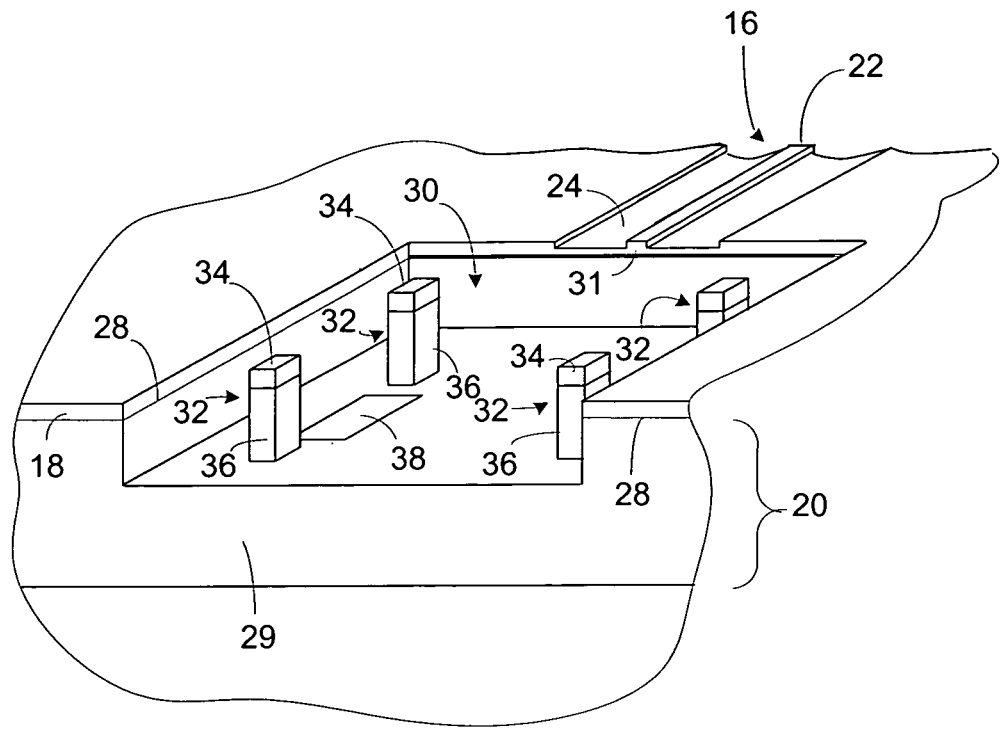
FIG. 2 is a perspective view of a portion of a base device that includes an interface for optically coupling the base device with an auxiliary device.

FIG. 2 is a perspective view of a portion of a base device that includes an interface for optically coupling the base device with an auxiliary device. The illustrated portion of the base device includes a stop recess 30 sized to receive the auxiliary device. The stop recess 30 extends through the light-transmitting medium 18 and into the base 20. In the illustrated version, the stop recess 30 extends through the light-transmitting medium 18, the light insulator 28, and into the substrate 29.

The base device includes a first waveguide 16 that terminates at the stop recess 30. For instance, the first waveguide 16 ends at a facet 31 positioned such that a light signal that exits the first waveguide 16 though the facet 31 can be received by an auxiliary device positioned in the stop recess 30. Although not shown, the facet 31 of the first waveguide 16 can include an anti-reflective coating. A suitable anti-reflective coating includes, but is not limited to, single-layer coatings such as silicon nitride or aluminum oxide, or multilayer coatings, which may contain silicon nitride, aluminum oxide, and/or silica.

One or more stops 32 extend upward from a bottom of the stop recess 30. For instance, FIG. 2 illustrates four stops 32 extending upward from the bottom of the stop recess 30. The stops 32 include a cladding 34 positioned on a base portion 36. The substrate 29 can serve as the base portion 36 of the stops 32 and the stop 32 can exclude the light insulator 28. The portion of the substrate 29 included in the stops 32 can extend from the bottom of the stop recess 30 up to the level of the light insulator 28. For instance, the stops 32 can be formed by etching through the light insulator 28 and using the underlying substrate 29 as an etch-stop. As a result, the location of the top of the base portion 36 relative to the optical mode of a light signal in the first waveguide 16 is well known because the light insulator 28 defines the bottom of the second waveguide and the top of the base portion 36 is located immediately below the light insulator 28. The cladding 34 can be formed on base portion 36 of the stops 32 so as to provide the stops 32 with a height that will provide the desired alignment between the first waveguide and a second waveguide on an auxiliary device.

Attachment pads 38 are positioned on the bottom of the stop recess 30. The attachment pads 38 can be used to immobilize the auxiliary device relative to the base device once the auxiliary device is positioned on the base device. In some instances, the attachment pads 38 also provide electrical communication between the base device and one or more components on the auxiliary device. Suitable attachment pads 38 include, but are not limited to, solder pads.

Figure 3:
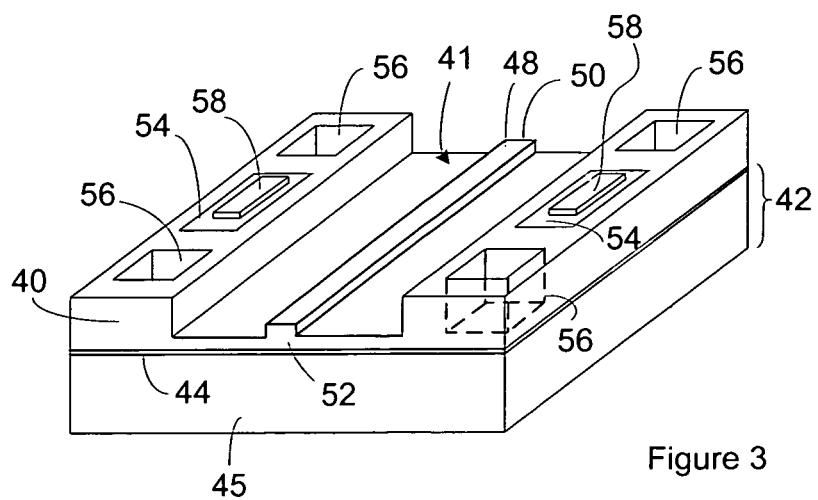
FIG. 3 is a perspective view of an auxiliary device suitable for use with the base device of FIG. 1A through FIG. 2.

FIG. 3 is a perspective view of one embodiment of the auxiliary device. The illustrated auxiliary device is within the class of devices known as planar optical devices. Additionally, the auxiliary device includes a light-transmitting medium 40 on a base 42. The base 42 includes a light insulator 44 on a substrate 45. The light-transmitting medium 40 on the auxiliary device can be the same material or different material from the light-transmitting medium 18 on the base device. The base 42 on the auxiliary device can be the same material or different material from the base 20 on the base device. The light insulator 44 on the auxiliary device can be the same material or different material from the light insulator 28 on the base device. The substrate 45 on the auxiliary device can be the same material or different material from the substrate 29 on the base device. In one examples, the light-transmitting medium 40 on the auxiliary device and the light-transmitting medium 18 on the base device are silicon, the light insulator 44 on the auxiliary device and the light insulator 28 on the base device are silica, and the substrate 45 on the auxiliary device and the substrate 29 on the base device are silicon. For instance, both the base device and the auxiliary device can be built on a silicon-on-insulator wafer.

The auxiliary device includes a second waveguide 41 that is partially defined by a ridge 48 extending upward from slab regions of the light-transmitting medium 40 or the base 42. The second waveguide 41 can provide an optical pathway between a first facet 50 and a second facet 52. Although not shown, the first facet 50 and/or the second facet 52 can optionally include an anti-reflective coating. A suitable anti-reflective coating includes, but is not limited to, single-layer coatings such as silicon nitride or aluminum oxide, or multilayer coatings that may contain silicon nitride, aluminum oxide, and/or silica.

The second facet 52 can have the dimensions of a multi-mode waveguide or a single-mode waveguide and/or the first facet 50 can have the dimension of multi-mode waveguide or a single-mode waveguide.

The second waveguide 41 of FIG. 3 provides an optical pathway directly between the second facet 52 and the first facet 50. For instance, the auxiliary device can exclude optical components that perform additional processing on a light signal guided between the second facet 52 and the first facet 50.

The auxiliary device includes one or more attachment pads 54 that can be employed to immobilize the auxiliary device relative to the base device. Suitable attachment pads 54 include, but are not limited to, solder pads.

The auxiliary device also includes one or more alignment recesses 56. The dashed lines in FIG. 3 show the depth and shape of one of the alignment recesses 56. In some instances, the alignment recesses 56 extend down to the light insulator 44. When the alignment recesses 56 extend down to the light insulator 44 the alignment recesses 56 can be formed by etching into the light-transmitting medium 40 using an etch where the light insulator 44 acts as an etch stop. In some instances, the alignment recesses 56 extend through the light insulator 44 to the top of the substrate 45. When the alignment recesses 56 extend through to the light insulator 44, the alignment recesses 56 can be formed by etching through the light insulator 44 using an etch where the material of the substrate 45 acts as an etch stop. Whether the alignment recesses 56 extend down to the light insulator 44 or down to the substrate 45, the depth of the alignment recesses 56 is not dependent on etch duration or other variables, and is accordingly consistent between different auxiliary devices. Additionally, since the alignment recesses 56 extend down to the light insulator 44 or down to the top of the substrate 45, the position of the bottom of the alignment recesses 56 relative to the optical mode of a light signal in the second waveguide 41 is well known because the light insulator 44 defines the bottom of the second waveguide 41. As a result, the recesses are suitable for achieving vertical alignment of the auxiliary device relative to the base device.

Figure 4A:
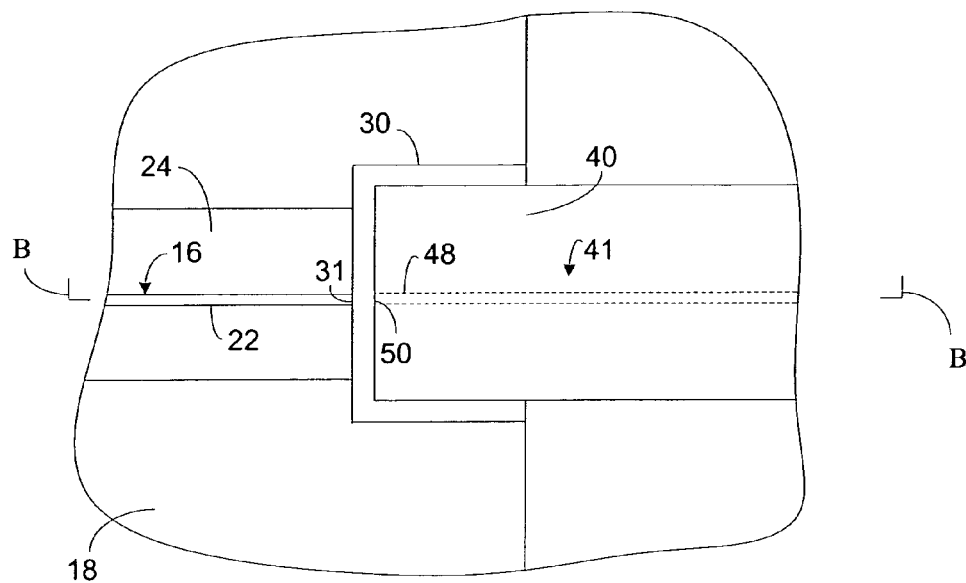
FIG. 4A and FIG. 4B illustrate system that includes the device of FIG. 2 interfaced with the auxiliary device of FIG. 3.
Figure 4B:
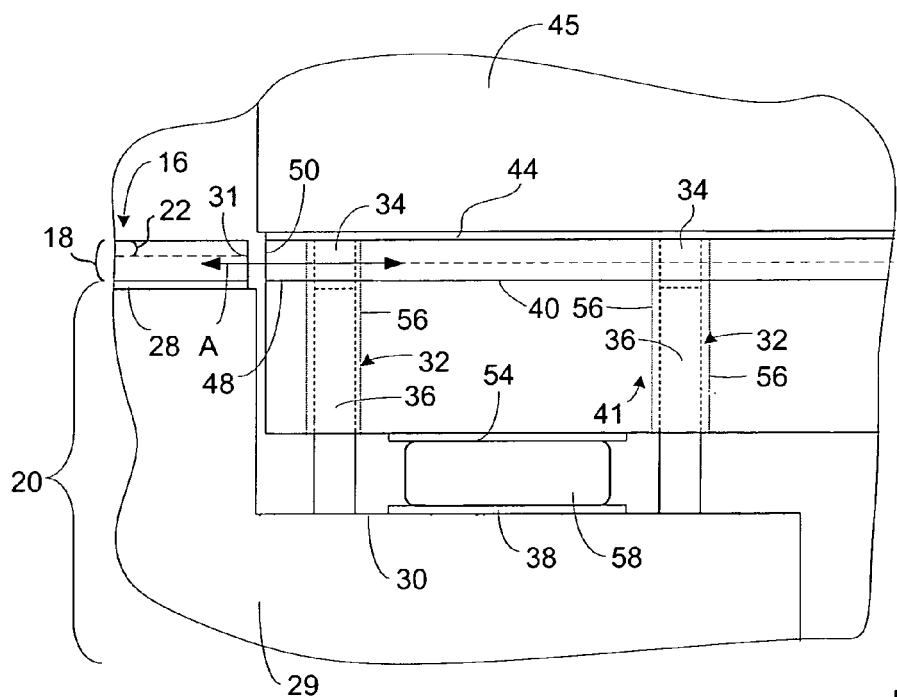

FIG. 4A and FIG. 4B illustrate system that includes the device of FIG. 2 interface with the auxiliary device of FIG. 3. FIG. 4A is a topview of the system. FIG. 4B is a cross section of the system taken through the first waveguide 16 on the base device and the second waveguide 41 on the auxiliary device. FIG. 4A and FIG. 4B each includes dashed lines that illustrate features that are located behind other features in the system. For instance, FIG. 4A includes dashed lines showing the location of the second waveguide 41 even though the second waveguide 41 is located under the base 42 of the auxiliary device. Additionally, FIG. 4B includes dashed lines that illustrate the locations of the portion of the stops 32 and alignment recesses 56 located behind the ridge 48 of the second waveguide 41. FIG. 4 also includes dashed lines that illustrate the location where the ridge 22 of the first waveguide 16 interfaces with slab regions of the base device and also dashed lines that illustrate the location where the ridge 22 of the second waveguide 41 interfaces with slab regions of the auxiliary device.

The auxiliary device is positioned in the stop recess 30 on the base device. The auxiliary device is positioned such that the second waveguide 41 is located between the base 42 of the auxiliary device and the base 20 of the base device. Accordingly, the auxiliary device is inverted in the stop recess 30. Solder or other adhesive 58 contacts the attachment pads 38 on the bottom of the stop recess 30 and the attachment pads 54 on the auxiliary device. For instance, the solder or other adhesive 58 extends from an attachment pad 38 on the bottom of the stop recess 30 to an attachment pad 54 on the auxiliary device. Accordingly, the solder or other adhesive 58 immobilizes the auxiliary device relative to the base device.

The facet 31 of the first waveguide is aligned with the first facet 50 of the second waveguide 41 such that the first waveguide and the second waveguide 41 can exchange light signals. As shown by the line labeled A, the system provides a horizontal transition path in that the direction that the light signal travels when between the base device and the auxiliary device is horizontal or is substantially horizontal. The horizontal direction can be a result of the facet 31 of the first waveguide being perpendicular to the base 20 of the base device or substantially perpendicular to the base 20 of the base device and/or the first facet 50 of the second waveguide 41 being perpendicular to the base 42 of the auxiliary device or substantially perpendicular to the base 42 of the auxiliary device. In some instances, the first facet 50 of the second waveguide 41 is also perpendicular to the base 20 of the base device or substantially perpendicular to the base 20 of the base device. A top of the first facet 50 of the second waveguide 41 is at a level that is below the top of the facet 31 of the first waveguide. For instance, the facet 31 of the first waveguide and the first facet 50 of the second waveguide 41 each have a height above a horizontal plane on the base device. The height of the top of the facet 31 of the first waveguide relative to the plane is more than the height of the top of the first facet 50 of the second waveguide 41 relative to the plane. As discussed above, examples of a horizontal plane of the base device include the topside of the base 20, the bottom side of the base 20, the topside of the substrate 29, and/or the bottom side of the substrate 29.

As noted, the facet 31 of the first waveguide can be perpendicular or substantially perpendicular to the base 20 of the base device. Although not shown, the facet 31 of the first waveguide can also be angled at less than 90 degrees relative to the direction or propagation of a light signal in the first waveguide. An angle of less than 90 degrees can reduce the effects of back reflection in the first waveguide. As noted, the first facet 50 of the second waveguide 41 can be perpendicular or substantially perpendicular to the base 42 of the auxiliary device and/or the base 20 of the base device. Although not shown, the first facet 50 of the second waveguide 41 can also be angled at less than 90 degrees relative to the direction or propagation of a light signal in the second waveguide 41. An angle of less than 90 degrees can reduce the effects of back reflection in the second waveguide 41.

The one or more stops 32 on the base device are each received within one of the alignment recesses 56 on the auxiliary device. The top of each stop 32 contacts the bottom of the alignment recess 56. As a result, the interaction between stops 32 and the bottom of the alignment recesses 56 prevent additional movement of the auxiliary device toward the base device. In some instances, the auxiliary device rests on top of the stops 32.

As is evident from FIG. 4B, the first facet 50 of the auxiliary device is vertically aligned with the facet 31 of the first waveguide 16 on the base device. As is evident from FIG. 4A, the first facet 50 of the auxiliary device is horizontally aligned with the facet 31 of the first waveguide 16 on the base device. The horizontal alignment can be achieved by alignment of marks and/or features on the auxiliary device and the base device. As a result, the second waveguide 41 on the auxiliary device and the first waveguide 16 on the base device can exchange light signals.

The vertical alignment is achieved by controlling the height of the stops 32 on the base device. For instance, the cladding 34 on the base portion 36 of the stops 32 can be grown to the height that places the first facet 50 of the second waveguide 41 at a particular height relative to the facet 31 of the first waveguide 16 on the base device. As noted above, the position of the bottom of the alignment recess 56 relative to the first facet 50 and/or optical mode of the second waveguide 41 is known. Additionally, the position of the tops of the base portion 36 of the stops 32 relative to the first waveguide and/or optical mode in the first waveguide is also known. This information can be used to determine the thickness of the cladding 34 that will provide the second waveguide 41 with the desired vertical location relative to the first waveguide. The desired cladding 34 thickness can be accurately achieved by using deposition techniques such as evaporation, plasma enhanced chemical vapor deposition (PECVD), and/or sputtering to deposit the one or more cladding layers. As a result, one or more cladding layers can be deposited on the base portion 36 of the stops 32 so as to form the stops 32 to a height that provides the desired vertical alignment. Suitable materials for layers of the cladding 34 include, but are not limited to, silica, silicon nitride, and polymers.

Figure 5:
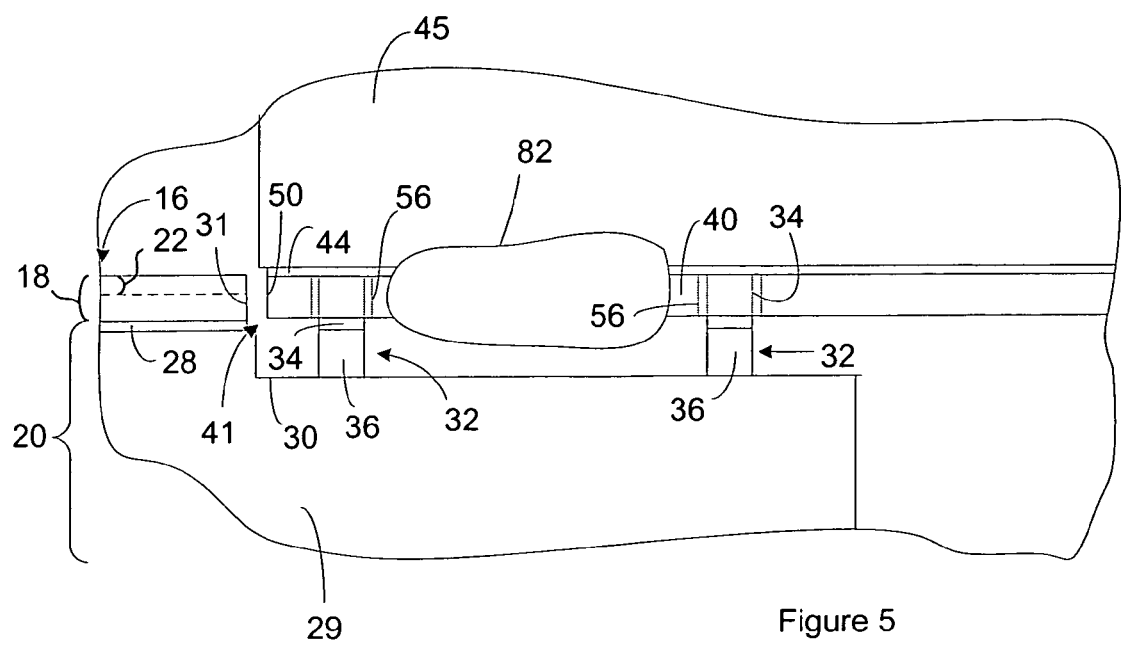
FIG. 5 is a cross section of a system that includes a base device aligned with an auxiliary device that includes optical components in addition to a second waveguide.

Although the device is shown above as excluding other optical components. The auxiliary device can include additional optical components 82 as shown in FIG. 5. FIG. 5 is a cross section of a system that includes a base device aligned with an auxiliary device that includes optical components 82 in addition to a second waveguide 41. The cross section is taken through the first waveguide 16 on the base device and the second waveguide 41 on the auxiliary device.

Examples of optical components 82 that can be included on the auxiliary device include, but are not limited to, one or more components selected from a group consisting of facets through which light signals can enter and/or exit a waveguide, taper for changing the mode size of a light signal guide by the second waveguide, entry/exit ports through which light signals can enter and/or exit a waveguide from above or below the auxiliary device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, modulators that convert a light signal to an electrical signal, and vias that provide an optical pathway for a light signal traveling through the auxiliary device from the bottom side of the auxiliary device to the top side of the auxiliary device. Additionally, the auxiliary device can optionally, include electrical components. For instance, the auxiliary device can include electrical connections for applying a potential or current to a waveguide and/or for controlling other components on the auxiliary device.

Figure 6:
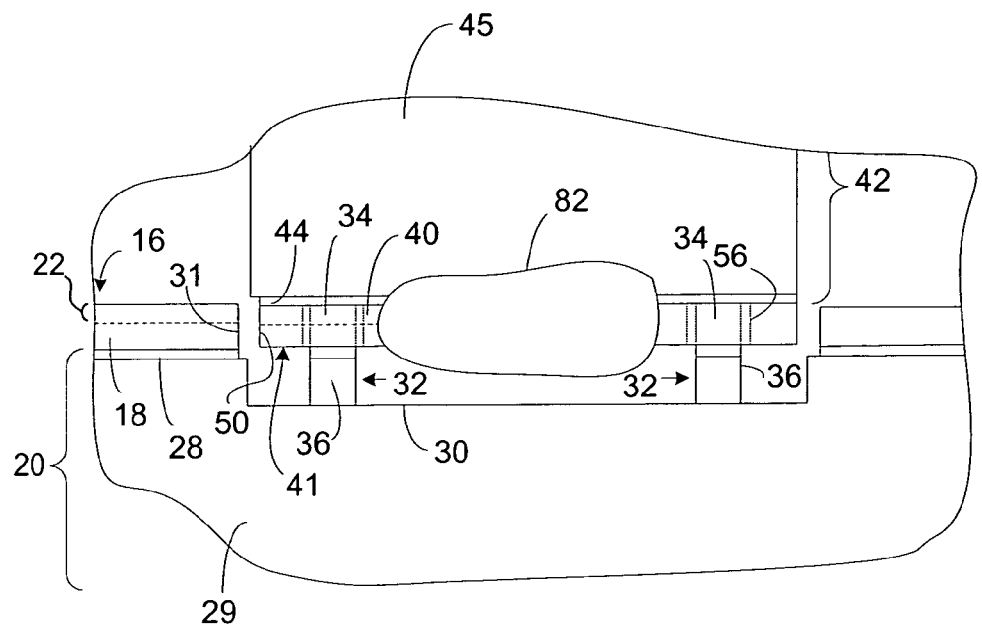
FIG. 6 is a cross section of a system that includes a base device aligned with an auxiliary device.

The above illustrations of the system show the auxiliary device located at an edge of the base device. However, an auxiliary device can be centrally located on the base device. FIG. 6 is a cross section of a system that includes a base device aligned with an auxiliary device. The cross section is taken through the first waveguide 16 on the base device and the second waveguide 41 on the auxiliary device. The auxiliary device is centrally located on the base device. As a result, in some instances, the stop recess 30 surrounds the auxiliary device.

Figure 7:
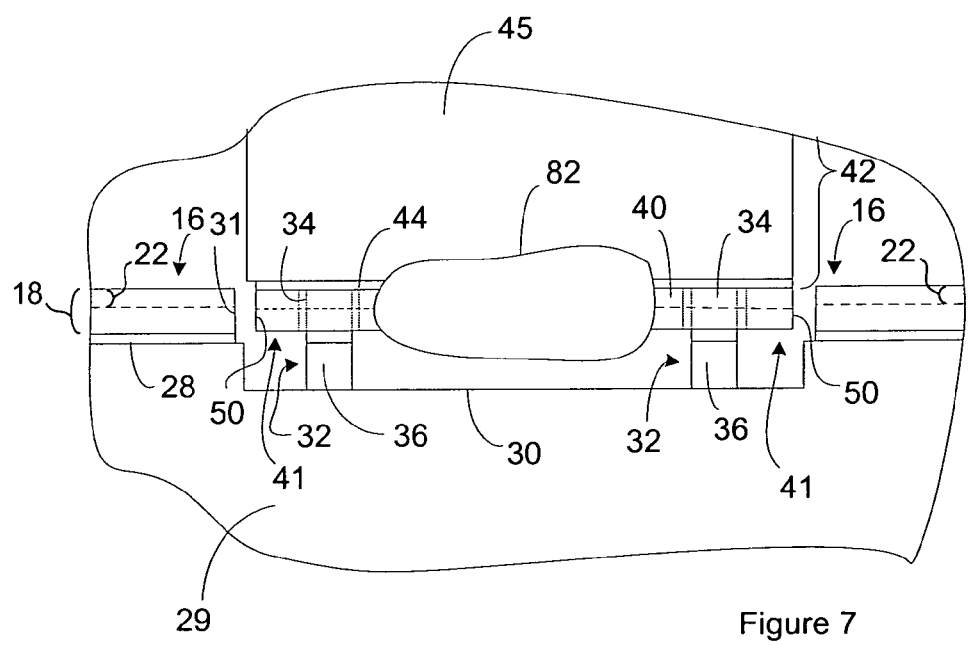
FIG. 7 is a cross section of a system that includes a base device aligned with an auxiliary device.

FIG. 6 shows a second waveguide 41 on one side of the auxiliary device aligned with a first waveguide 16 on the base device. However, the facets 31 of more than one first waveguide 16 on the base device can be aligned with a facet on the auxiliary device. FIG. 7 is a cross section of a system that includes a base device aligned with an auxiliary device. The cross section is taken through the first waveguide 16 on the base device and the second waveguide 41 on the auxiliary device. The auxiliary device is includes two second waveguides 41 that each ends at a facet. The facet of each second waveguide 41 is aligned with the facet of a first waveguide 16 on the base device.

Figure 8:
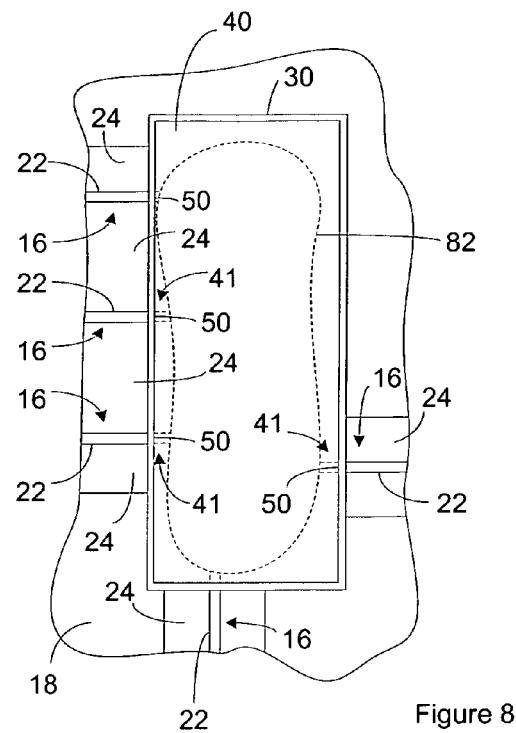
FIG. 8 is a topview of a system that includes a base device aligned with an auxiliary device.

The above characteristics make the system suitable for interfacing an array of waveguides on the base device with an auxiliary device that also includes an array of waveguides. For instance, FIG. 8 is a topview of a system that includes a base device aligned with an auxiliary device. FIG. 8 includes dashed lines the illustrate features that are located behind other features in the system. For instance, FIG. 8 includes dashes lines showing the location of second waveguides 41 and one or more optical components 82 even though the second waveguides 41 and one or more optical components 82 are located under the base 42 of the auxiliary device. FIG. 8 shows an array of three second waveguides 41 on the auxiliary device that are each aligned with a first waveguide 16 on the base device. In these instances, the one or more components 82 can include multiple lasers or multiple light sensors. As a result, the system is suitable for interfacing a single device that includes an array of lasers and/or light sensors with a base device.

Although FIG. 6-8 show the auxiliary device centrally located on the base device, these systems can also be formed with the auxiliary device located at an edge of the base device. Additionally or alternately, although FIGS. 6-8 show the auxiliary device as including one or more optical components 82, the auxiliary device can exclude the one or more optical components 82.

Figure 9:
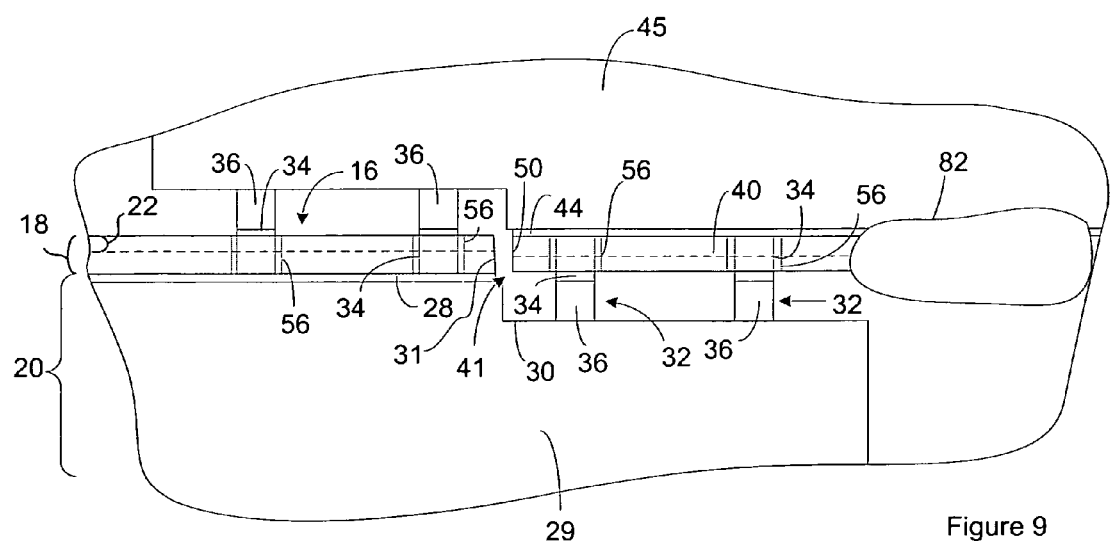
FIG. 9 is a cross section of a system that includes a base device aligned with an auxiliary device that includes optical components in addition to a second waveguide.

In each of the systems disclosed above, the base device includes one or more stops 32 extending upward from a bottom of the stop recess 30 and the auxiliary device includes one or more alignment recesses 56 that each receives one of the stops 32. However, each of the systems disclosed above can be modified so the auxiliary device includes the one or more stops 32 extending upward from a bottom of a stop recess 30 and the base device further includes the one or more alignment recesses 56 that each receives one of the stop 32 from the auxiliary device. Alternately, each of the systems disclosed above can be modified so the auxiliary device includes one or more stops 32 extending upward from a bottom of a stop recess 30 and also includes alignment recesses 56 and the base device includes one or more stops 32 extending upward from a bottom of a stop recess 30 and also includes alignment recesses 56. As an example, FIG. 9 illustrates the system of FIG. 5 with the auxiliary device modified to include alignment recesses 56 and also one or more stops 32 extending upward from a bottom of a stop recess 30 and the base device modified to include alignment recesses 56 and one or more stops 32 extending upward from a bottom of a stop recess 30. As is evident from FIG. 9, the stops 32 and alignment recesses 56 are positioned such that the stops 32 on the base device are received in the alignment recesses 56 on the auxiliary device and the stops 32 on the auxiliary device are received in the alignment recesses 56 on the base device. The presence of stops 32 on both the base device and the auxiliary device can enhance the degree of alignment between the base device and the auxiliary device.

In some instances, the arrangement of the stops 32 and alignment recesses 56 on the base device match the arrangement of the stops 32 and alignment recesses 56 on the auxiliary device. For instance, the pattern of the stops 32 on the base device, the dimensions of the stops 32 on the base device, and the displacement between each of the stops on the base device and the facet of the first waveguide can be the same on the base device and the auxiliary device. Additionally, the pattern of the alignment recesses 56 on the base device, the dimensions of the alignment recesses 56 on the base device, and the displacement between each of the alignment recesses 56 and the facet of the first waveguide can be the same on the base device and the auxiliary device. As will be discussed in more detail below, using a common arrangement of stops 32 and alignment recesses 56 can optimize the interchangeability of base devices and auxiliary devices.

Structural alternative to the stops 32 can be employed in each of the systems disclosed above. For instance, the base device and the auxiliary device can each include one or more alignment pits 57 located such that the alignment pits 57 align upon assembly of the system. For instance, alignment pits 57 can each extend into a stop recess 30 at the location where the stops are illustrated above. Additionally, alignment pits 57 can each extend into the bottom of an alignment recesses 56 disclosed above. Since the stops 32 disclosed above align with the alignment recesses upon assembly of the system, the alignment pits 57 in these locations are also aligned during assembly of the system. When the system is assembled, an alignment structure 59 is positioned so it spans the distance between aligned alignment pits 57.

Figure 10:
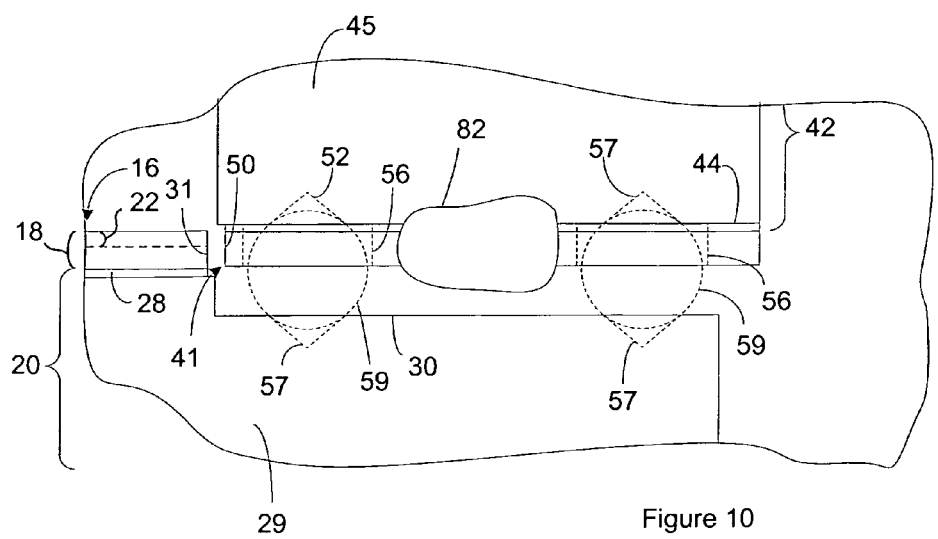
FIG. 10 is a cross section of a system that includes a base device aligned with an auxiliary device that includes optical components in addition to a second waveguide.

An illustration of the use of alignment pits 57 is presented in FIG. 10. FIG. 10 is the system of FIG. 5 but with alignment pits 57 substituted for the stops 32 on the base device and alignment pits 57 located in the bottom of the alignment recesses on the auxiliary device. A ball or sphere serves as an alignment structure 59 that spans the distance between an alignment pit 57 on the auxiliary device and the base device. In this case, the alignment structure 59 is a ball, however, other alignment structures 59 such as rods can be employed. Since the alignment structure 59 spans the alignment pits 57, the alignment structure 59 serves as a spacer between the base device and the auxiliary device. The system can include additional alignment structures 59 acting as spacers between alignment pits 57 on the base device and the auxiliary.

Accordingly, alignment devices can hold the base device and the auxiliary device in a substantially parallel orientation.

The alignment pits 57 can be formed by wet etching. When the light-transmitting medium 18 or light-transmitting medium 40 is silicon, the wet etch naturally provides the sides of the alignment pit 57 with an angle of around 54.7°.

In some instances, the arrangement of alignment pits 57 on the base device match the arrangement of the alignment pits 57 on the auxiliary device. For instance, the pattern of the alignment pits 57 on the base device, the dimensions of the alignment pits 57 on the base device, and the displacement between each of the alignment pits 57 on the base device and the facet of the first waveguide can be the same on the base device and the auxiliary device. As will be discussed in more detail below, using a common arrangement of alignment pits 57 can optimize the interchangeability of base devices and auxiliary devices.

Figure 11A:
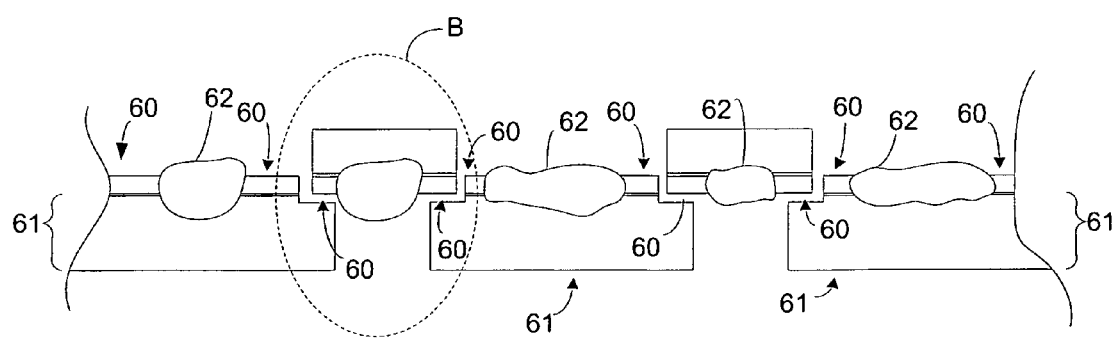
FIG. 11A is a schematic of multiple modules assembled into an optical system.

The above base devices and/or auxiliary devices can serve as modules that can be assembled into optical systems. For instance, FIG. 11A is a schematic of multiple modules assembled into an optical system. As is evident in FIG. 11, each of the modules includes one or more module waveguides 60 on a module base 61. Each module waveguide 60 carries light to and/or from a module component 62. Since each of the modules can be a base device or an auxiliary device as disclosed above, a first waveguide 16 disclosed above or a second waveguide 41 disclosed above can serve as a module waveguide 60. Additionally, a base 20 or a base 42 disclosed above can serve as the module base 61.

Each of the module components 62 can represent one or more of the optical components 82 disclosed above. Alternately, the module component 62 need not represent an optical component but can instead represent another portion the module waveguide 60. As a result, a module waveguide 60 can be continuous across a module.

As is evident from FIG. 11A, the module waveguides 60 from different modules are aligned such that aligned module waveguides 60 can exchange light signals. As a result, the optical system guides a light signal produced by one module component 62 through one or more module waveguides 60 on other modules to another of the module components 62. As noted above, in some instances, one or more of the module components 62 can represent a portion of a module waveguide 60. As a result, one or more of the modules can serve only to route a light signal from one module to another module without performing any additional processing of the light signal.

FIG. 11A appears to illustrate that the module waveguide 60 of different modules are all located in a single plane. However, the module waveguides 60 can be curved or include module components 62 that change the direction of propagation of a light signal. As a result, the optical pathway through the module waveguides 60 shown in FIG. 11A need not be in a single plane.

In one example of a system according to FIG. 11A, one of the module components 62 on a first module is a transmitter (not shown) that serves as a source of a light signal, another of the module components 62 on a second module is a portion of the module waveguide 60, and another of the module components 62 on a third module is a receiver (not shown). The second module receives the light signal from the first module and guides the light signal to the third module. The third module receives the light signal and the receiver 86 converts the received light signal to an electrical signal.

Figure 11B:
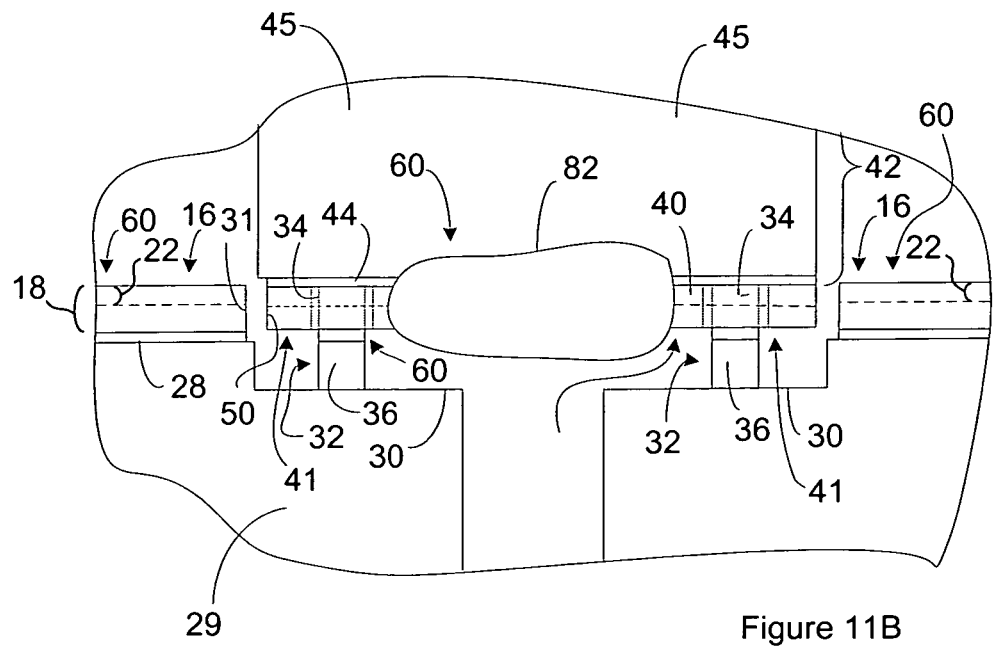
FIG. 11B illustrates an interface between different modules in the optical system of FIG. 11A.

An example of an interface between different modules in the optical system of FIG. 11A is illustrated in FIG. 11B. For instance, the interface shown in FIG. 11B can represent the interface in the circle labeled B in FIG. 11A. FIG. 11B illustrates an auxiliary device interfaced with two base devices; however, a base device can be interfaced with one, two, or more than two base devices as shown in FIG. 11B and/or an auxiliary device can be interfaced with one, two, or more than two auxiliary devices as shown in FIG. 11B.

The interface illustrated in FIG. 11B is in accordance with the interface of FIG. 5 through FIG. 7. However, the other interfaces disclosed above can be used. For instance, two modules that exchange light signals can be interfaced as discussed in association with FIG. 8 or FIG. 9. The interface of FIG. 9 increases the degree of modularity in the system. For instance, two modules that each includes only stops and each excludes alignment recesses are difficult to interface with one another. In contrast, when modules include both stops 32 and alignment recesses 56 as shown in FIG. 9, the number or different modules that can be interfaced increases. For instance, when each of the modules has both stops 32 and alignment recesses 56 in the same arrangement on and relative to the edge of the stop recess 30 and with the same spacing, any of different modules can be interfaced with one another. As a result, in some instances, multiple modules that include different optical components 82 each includes both stops 32 and alignment recesses 56 and the arrangement of the stops 32 and alignment recesses 56 on one of the modules and the spacing of the stops 32 and alignment recesses 56 on that module is the same as the arrangement and spacing of the stops 32 and alignment recesses 56 on the other modules. When different alignment structures such as alignment pits 57 are used, the same technique can be employed to increase modularity. As a result, in some instances, multiple modules includes alignment pits 57 and the arrangement of the alignment pits 57 on one of the modules and the spacing of the alignment pits 57 on that module is the same as the spacing and arrangement of the alignment pits 57 on multiple different modules.

Figure 12A:
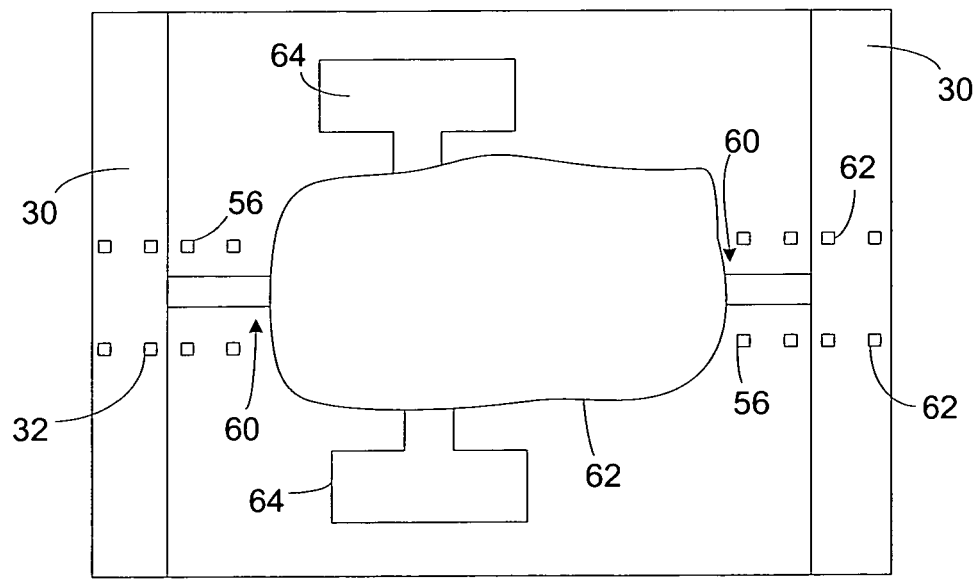
FIG. 12A is a topview of a module having a module component that includes contact pads configured to be in electrical communication with electronics.

Certain module components 62 include contact pads 64 that allow the module component 62 to be operated by electronics that are off the module and/or are on the module. FIG. 12A is a topview of a module having a module component 62 that include contact pads 64 configured to be in electrical communication with electronics. Although FIG. 12A shows the module component 62 with two contact pads 64, a module component 62 can have more than two contact pads 64 or as few as one contact pad 64. Examples of these types of module components 62 include, but are not limited to, lasers, light sensors, modulators, attenuators, amplifiers, polarization splitters, polarization rotators, splitters and couplers. Although FIG. 9A shows one or more module waveguides 60 terminating at two different edges of the module, the module can include a single module waveguide 60 that terminates at the module component 62.

Figure 12B:
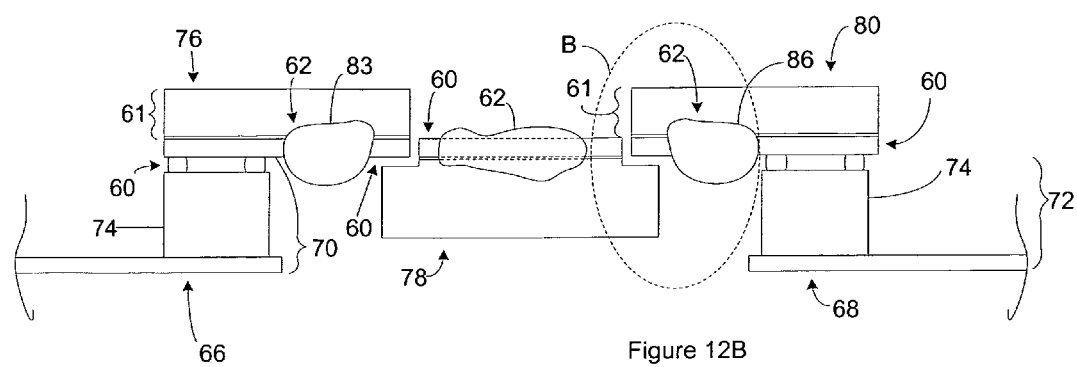
FIG. 12B illustrates modules assembled into an optical system that is interfaced with first electronics and second electronics.

Modules having electrical contact pads 64 can be incorporated into electrical systems. For instance, FIG. 12B illustrates modules assembled into an optical system and interfaced with first electronics 66 and second electronics 68. The first electronics 66 include a first circuit board 70. The second electronics 68 include a second circuit board 72. The first circuit board 70 and the second circuit board 72 each includes a controller 74 in electrical communication with the contact pads 64 on one of the module components 62. For instance, electrical conductors such as solder balls can provide an electrical pathway between contact pads 64 on the controller 74 and the contacts on a module component 62. Each controller 74 employs the electrical connections between the module component 62 and the controller 74 to operate one of the module components 62 and/or to receive output from the module component 62. The modules are also interfaced with one another such that they form an optical system such as the optical system of FIG. 11A. Each circuit board can communicate with a module component 62 in the optical system. For instance, a light signal can be generated at one of the modules or that module can receive the light signal from an outside source such as an optical fiber. The light signal can be routed through the module waveguides 60 on one or more of the modules to a receiver 86 included on a first one of the modules. Electronics can operate the receiver 86 so as to convert the received light signal received to an electrical signal that is further processed by the electronics.

In one example, the circuit boards make use of the optical system to communicate with one another. For instance, the optical system of FIG. 12B can include a first module 76, a second module 78, and a third module 80. The module components 62 can be arranged such that the first electronics 66 and the second electronics 68 can communicate with one another through the optical system. For instance, the first module 76 can have a module component 62 that includes or consists of a transmitter 83 that generates a light signal. In one example, the transmitter 83 includes or consists of a laser. The first electronics 66 can operate the laser so it generates an output light signal. For instance, the controller 74 can apply an electrical signal to the laser that pumps the laser such that the laser outputs a light signal. In some instances, the electrical signal applied by the controller 74 is a modulated electrical signal and, as a result, the light signal generated by the laser is also modulated. For instance, the modulated electrical signal can cause the output from the laser to be started and stop such that the laser output is intensity modulated. As a result, the modulated light signal can carry data that was included in the modulated electrical signal. The modulated light signal can be the output from the module.

In another example, the module component 62 included on the first module 76 includes or consists of a transmitter 83 that includes or consists of a laser and a modulator. The laser and modulator can be arranged such that the modulator receives a light signal produced by the laser. The controller 74 in the first electronics 66 applies an electrical signal to the laser such that the laser outputs a light signal. The controller 74 in the first electronics 66 also employs the electrical connections between the module component 62 and the controller 74 to operate the modulator that receives the unmodulated light signal from the laser. In some instances, the controller 74 operates the modulator so as to modulate the light signal received from the laser. For instance, the controller 74 can apply a modulated electrical signal to the modulator such that the modulator modulates the output from the laser. As a result, a modulated light signal is output from the modulator. The modulated light signal can be modulated so as to include data that was included in the modulated electrical signal. The modulated light signal output from the modulator can be the output from the first module 76.

Figure 12C:
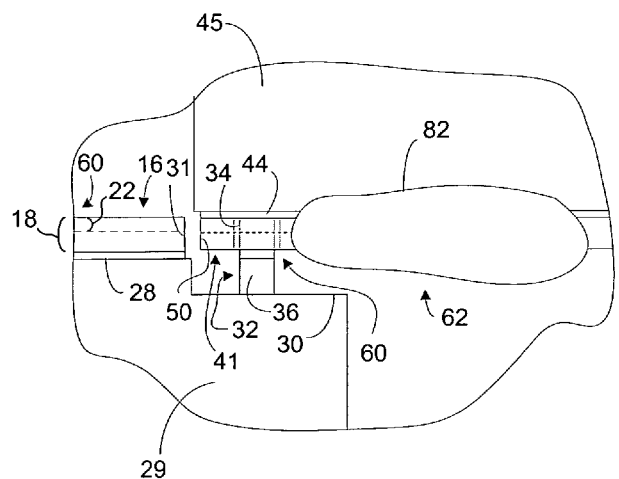
FIG. 12C illustrates an interface between different modules in the optical system of FIG. 12B.

The second module 78 is interfaced with the first module 76 so as to receive the modulated light signal output from the first module 76. FIG. 12C illustrates an example of a possible interface between the first module 76 and the second module 78. For instance, the interface shown in FIG. 12C can represent the interface in the circle labeled B in FIG. 11A. FIG. 11B illustrates an auxiliary device interfaced with two base devices; however, a base device can be interface with one, two, or more than two base devices as shown in FIG. 11B and/or an auxiliary device can be interfaced with one, two, or more than two auxiliary devices as shown in FIG. 11B.

The illustrated interface is in accordance with the interface of FIG. 5 through FIG. 7. However, the other interfaces disclosed above can be used. For instance, two modules that exchange light signals can be interfaced as discussed in association with FIG. 8 or FIG. 9. In some instances, the interface of FIG. 9 increases the degree of modularity permitted by the system.

The module component 62 in the second module 78 represents another portion of the module waveguide 60 on the second module 78. As a result, the second module 78 serves to route the modulated light signal through the second module 78. The use of a module that serves only to route light signals from one location to another location allows the displacement between the different electronics to be easily adjusted. For instance, the distance between the first circuit board 70 and the second circuit board 72 can be increased by using a longer second module 78.

The third module 80 receives the modulated light signal from the second module 78. The module component 62 on the third module 80 includes or consists of a receiver 86 that outputs an electrical signal in response to the receiver 86 receiving the light signal. In one example, the receiver 86 includes or consists of a light sensor. The controller 74 connected to the third module 80 operates the light sensor such that the modulated light signal is converted to an electrical signal that is further processed by the second electronics 68. In some instances, the second electronics 68 processes the electrical signal so as to recover the modulated electrical signal that was applied by the original controller 74. As a result, the incorporation of the optical system into an electrical system as described allows the modulated electrical signal from the first electronics 66 to be communicated to the second electronics 68 through the optical system. Accordingly, data included in the modulated electrical signal from the first circuit board 70 is communicated to the second circuit board 72 through the optical system.

Figure 13:
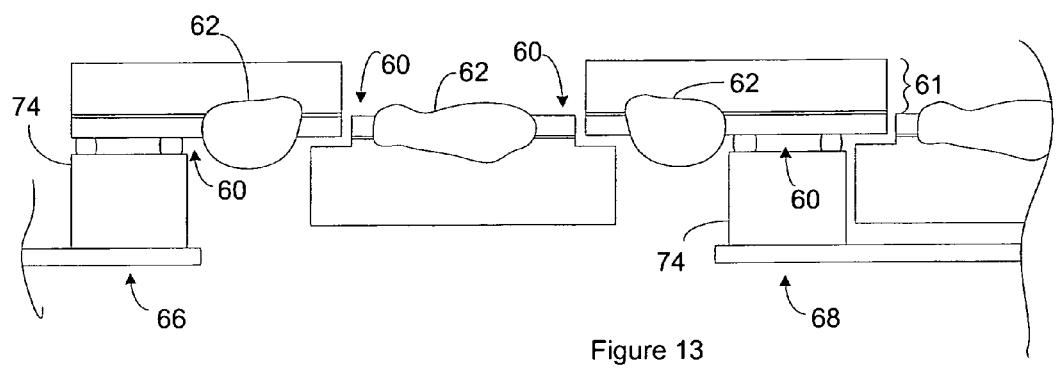
FIG. 13 is a schematic of an optical system.

FIG. 12B illustrates only three modules included in the optical system, however, an optical system incorporated into an electrical system as disclosed can include as few as two modules or more than three modules. For instance, FIG. 13 illustrates an optical system that includes at least four modules. Additionally, the second electronics 68 are interfaced with a module that is optically aligned with two other modules. Accordingly, a single module can have more than one module waveguide 60 that exchanges light signals with another module. Additionally or alternately, FIG. 12B shows two different sets of electronics in the form of first electronics 66 and second electronics 68; however, an optical system can be incorporated into an electrical system that includes as few as one set of electronics. For instance, all or a portion of the modules in the optical systems disclosed above can be optically coupled to optical fibers that carry light signals into and/or out of the optical system. As a result, the electrical system need not include a transmitter 83 for generating light signals or a receiver 86. Further, the optical system can be incorporated into an electrical system that includes more than two sets of electronics.

Figure 15A:
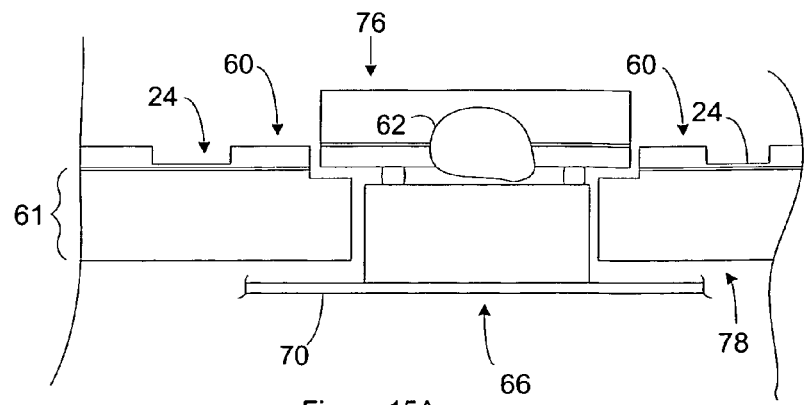
FIG. 15A is a cross section of an optical system.
Figure 15B:
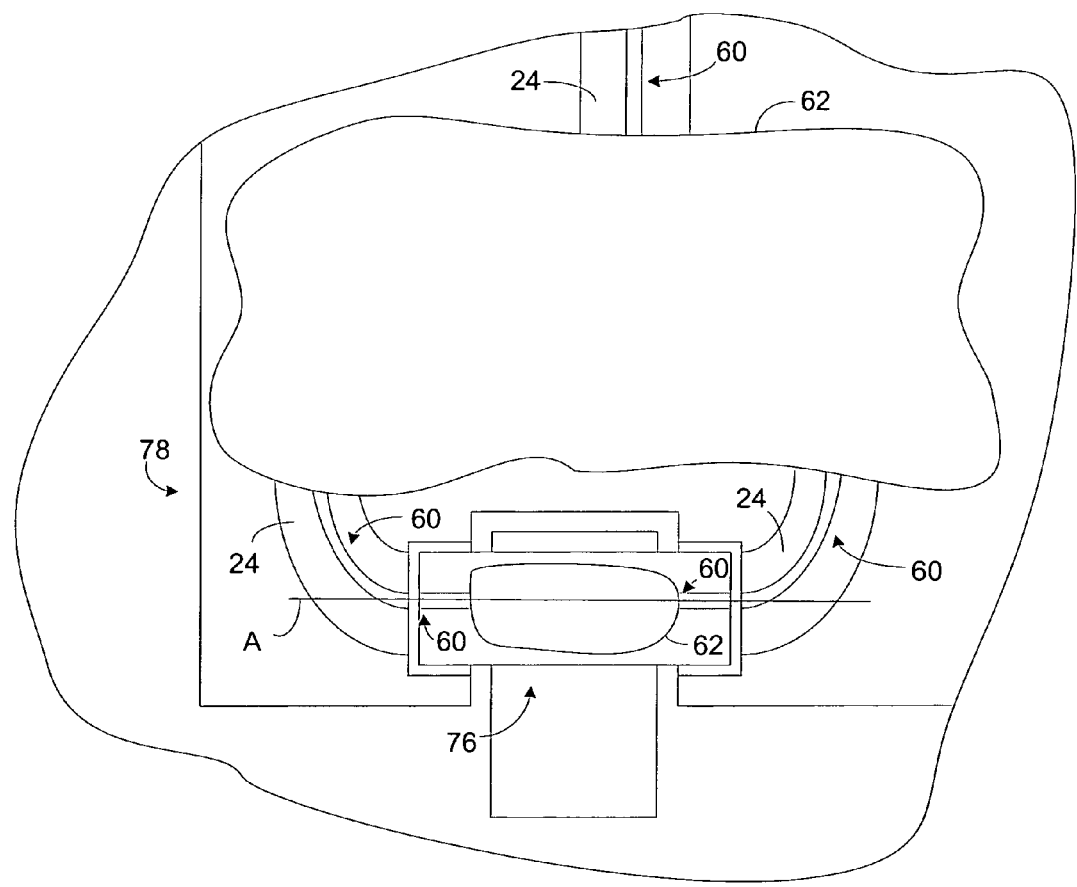
FIG. 15B is a topview of the optical system shown in FIG. 15A.

A module that is interfaced with electronics can have one or more module waveguides that are each interfaced with a modules waveguide on another module. FIG. 15A is a cross section of an optical system that includes a first module 76 interfaced with first electronics 66. FIG. 15B is a topview of the system shown in FIG. 15A. The cross section of FIG. 15A is taken along the line labeled A in FIG. 15B. The dashed lines in FIG. 15B show the location of a module waveguide 60 even though the module waveguide 60 is located under the module base 61. The first module 76 includes a module component 62 and is interfaced with first electronics 66 on a first circuit board 70 such that the first electronics 66 operate the module component 62. The first module 76 also includes two module waveguides 60 that are each interfaced with a module waveguide 60 included on a second module 78. Accordingly, the module waveguides 60 included on the first module 76 each exchange light signals with a module waveguide on the second module 78. Examples of the module component 62 on the first module include, but are not limited to, a laser, a light sensor, a modulator, an attenuator, a splitter and a coupler.

Figure 14:
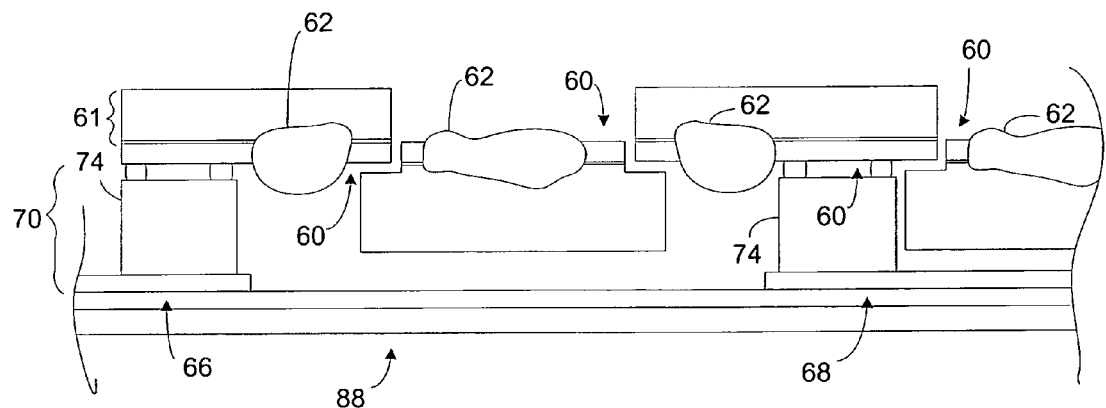
FIG. 14 shows the electrical system and the optical system of FIG. 12B located on a common substrate.

The electronics that are interfaced with different modules within the optical system can be located on a common substrate 88. For instance, FIG. 14 shows the first electronics 66, second electronics 68, and the optical system of FIG. 12B located on a common substrate 88. Suitable common substrates 88 include, but are not limited to, heat sinks. Examples of heat sinks include metals such as copper, aluminum and aluminum alloys. The use of a heat sink as a common substrate 88 can conduct heat generated with the optical and electrical system away from these systems.

Figure 16A:
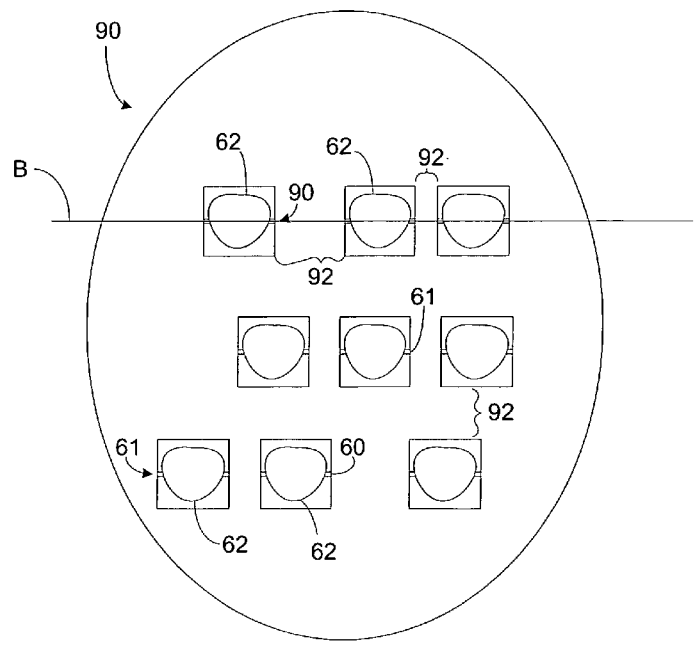
FIG. 16A is a topview of a wafer on which several modules have been formed.
Figure 16B:
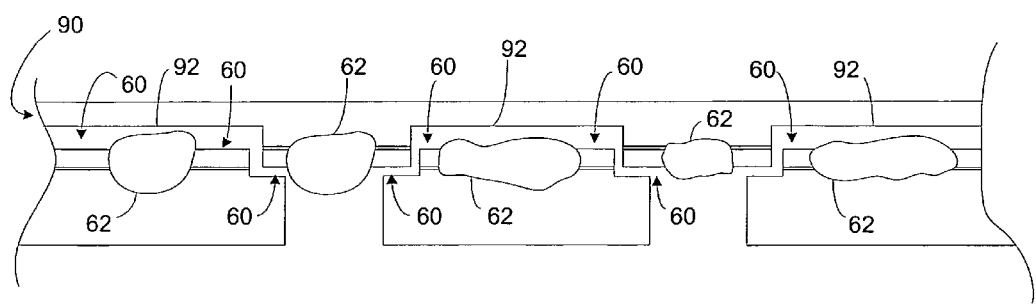
FIG. 16B illustrates an optical system constructed using the modules included on the wafer of FIG. 16A.

Different modules included in an optical system can be formed on the same wafer without separating them from one another. For instance, FIG. 16A is a topview of a wafer 90 on which several modules have been formed. FIG. 16B illustrates an optical system constructed using the modules included on the wafer 90 of FIG. 16A. For instance, the inverted modules in FIG. 16A are all included on the same wafer 90. In particular, a cross section of the wafer 90 shown in FIG. 16A taken along the line labeled B in FIG. 16A provides the modules that are inverted in FIG. 16B.

The optical system of FIG. 16A includes modules that are inverted and are included on the same wafer 90. A portion of the wafer 90 connects the module bases 61 of the different inverted modules and immobilizes the inverted modules relative to one another. In order to make vertical alignment possible, the tops of the non-inverted modules extend into recesses 92 between the modules on the wafer 90. Since the inverted modules are all fabricated on the same wafer 90, the alignment between the inverted modules when they are incorporated into the optical system is the same as the alignment that was provided during fabrication of the inverted modules. As a result, allowing multiple modules to remain immobilized by all or a portion of the wafer 90 on which they were fabricated can enhance the degree of alignment in the optical system.

The wafer 90 illustrated in the optical system of FIG. 16A and FIG. 16B is a silicon-on-insulator wafer although other wafers can be used. The silicon substrate of the silicon-on-insulator wafer connects the module bases 61 of the inverted modules and immobilizes the inverted modules relative to one another. The recesses 92 can be formed in the silicon-on-insulator wafer through etching to the desired depth.

Although the non-inverted modules in FIG. 16B are shown as being physically independent from one another, in some instances, all or a portion of the non-inverted modules are also included on at least a portion of a wafer that immobilizes the non-inverted modules relative to one another.

Examples of suitable circuit boards for use with the electrical system include, but are not limited to, boards that have an electrically insulating substrate that mechanically supports and mechanically connects electrical components and the conductive pathways between those components. Examples of suitable circuit boards include, but are not limited to, integrated circuit boards, printed circuit boards (PCBs), etched wiring boards, printed circuit assemblies (PCAs), and PCB Assemblies (PCBAs). The first electronics 66 and the second electronics 68 need not include circuit boards. For instance, the first electronics 66 and/or the second electronics 68 can be wire wrap construction or point-to-point construction.

The first electronics 66 and/or the second electronics 68 need not include a controller 74 but can include any electrical component or collection of electrical components capable of performing the attributed functions. When the first electronics 66 and/or the second electronics 68 include a controller 74, a suitable controller 74 includes, but is not limited to, a general purpose processor, a digital signal processor ("DSP"), an ASIC, FPGA or programmable logic device, discrete gate or transistor logic, discrete hardware components, or any combination thereof designed to perform the functions described herein. A general-purpose processor can be a microprocessor, but in the alternative, the processor can be any processor, controller 74, microcontroller 74, or state machine. A processor can also be implemented as a combination of computing devices, for example, a combination of a DSP and a microprocessor, a plurality of microprocessors, one or more microprocessors in conjunction with a DSP core, or any other such configuration.

Figure 17:
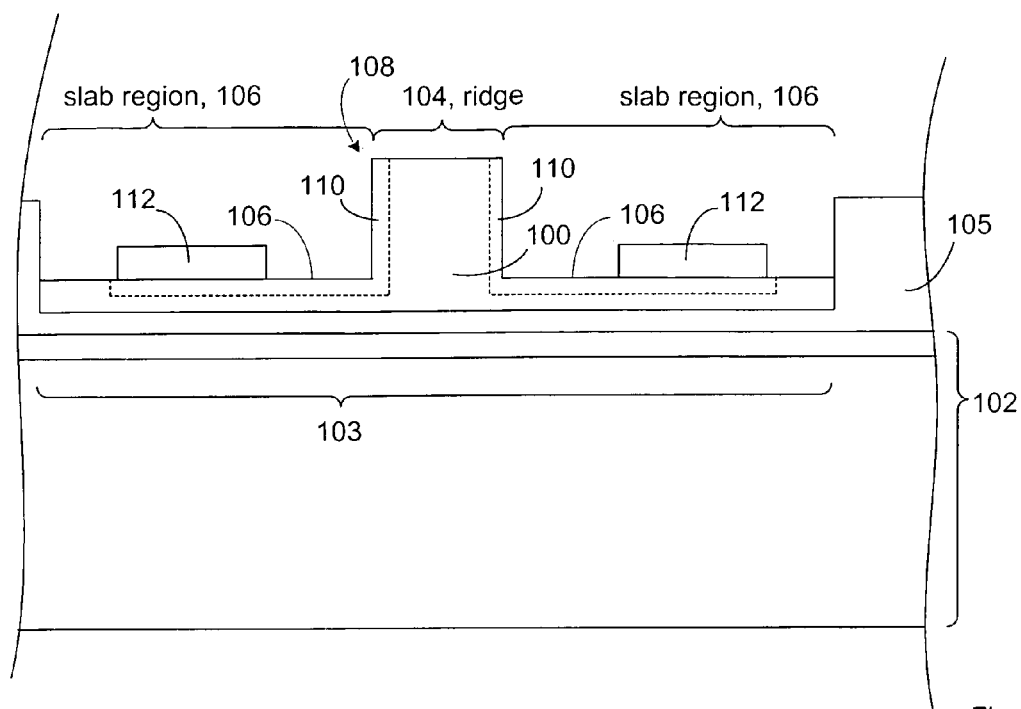
FIG. 17 is a cross section of an active component that can be included in a module component and operated as a modulator and/or light sensor.

As discussed above, a module component can include or consist of a light sensor and/or modulator. FIG. 17 is a cross section of an active component that can be included in a module component and operated as a modulator and/or light sensor. An active medium 100 is positioned on a base 102. In particular, the active medium 100 is positioned on a seed portion 103 of a light-transmitting medium 105. A ridge 104 of the active medium 100 extends upward from a slab region 106 of the active medium 100 and defines a component waveguide 108 through the active component.

Doped regions 110 are both in the slab regions 106 of the active medium 100 and also in the ridge 104 of the active medium 100. For instance, doped regions 110 of the active medium 100 are positioned on the lateral sides of the ridge 104 of the active medium 100. In some instances, each of the doped regions 110 extends up to the topside of the active medium 100 as shown in FIG. 17. Additionally, the doped regions 110 extend away from the ridge 104 into the slab region 106 of the active medium 100. The transition of a doped region 110 from the ridge 104 of the active medium 100 into the slab region 106 of the active medium 100 can be continuous and unbroken as shown in FIG. 17.

Each of the doped regions 110 can be an N-type doped region 110 or a P-type doped region 110. For instance, each of the N-type doped regions 110 can include an N-type dopant and each of the P-type doped regions 110 can include a P-type dopant. In some instances, the active medium 100 includes a doped region 110 that is an N-type doped region 110 and a doped region 110 that is a P-type doped region 110. The separation between the doped regions 110 in the active medium 100 results in the formation of PIN (p-type region-insulator-n-type region).

Electrical conductors 112 are positioned on the slab region 106 of the active medium 100. In particular, the electrical conductors 112 each contact a portion of a doped region 110 that is in the slab region 106 of the active medium 100. Accordingly, each of the doped regions 110 is doped at a concentration that allows it to provide electrical communication between an electrical conductor 112 and one of the doped regions 110 in the active medium 100. As a result, electrical energy can be applied to the electrical conductors 112 in order to apply the electric field to the active medium 100. The region of the light-transmitting medium or active medium 100 between the doped regions 110 can be undoped or lightly doped as long as the doping is insufficient for the doped material to act as an electrical conductor 112 that electrically shorts the active component.

During operation of the active component of FIG. 17 as a modulator, electronics are employed to apply electrical energy to the electrical conductors 112 so as to form an electrical field in the active medium 100. For instance, the electronics can form a voltage differential between the doped regions 110. The electrical field can be formed without generating a significant electrical current through the active medium 100. The active medium 100 can be a medium in which the Franz-Keldysh effect occurs in response to the application of the electrical field. The Franz-Keldysh effect is a change in optical absorption and optical phase by an active medium 100. For instance, the Franz-Keldysh effect allows an electron in a valence band to be excited into a conduction band by absorbing a photon even though the energy of the photon is below the band gap. To utilize the Franz-Keldysh effect the active region can have a slightly larger bandgap energy than the photon energy of the light to be modulated. The application of the field lowers the absorption edge via the Franz-Keldysh effect and makes absorption possible. The hole and electron carrier wavefunctions overlap once the field is applied and thus generation of an electron-hole pair is made possible. As a result, the active medium 100 can absorb light signals received by the active medium 100 and increasing the electrical field increases the amount of light absorbed by the active medium 100. Accordingly, the electronics can tune the electrical field so as to tune the amount of light absorbed by the active medium 100. As a result, the electronics can intensity modulate the electrical field in order to modulate the light signal. Additionally, the electrical field needed to take advantage of the Franz-Keldysh effect generally does not involve generation of free carriers by the electric field.

Suitable active media for use in the modulator include electro-absorption media such as semiconductors. However, the light absorption characteristics of different semiconductors are different. A suitable semiconductor for use with modulators employed in communications applications includes $Ge_{1-x}Si_x$ (germanium-silicon) where x is greater than or equal to zero. In some instances, x is less than 0.05, or 0.01. Changing the variable x can shift the range of wavelengths at which modulation is most efficient. For instance, when x is zero, the modulator is suitable for a range of 1610-1640 nm. Increasing the value of x can shift the range of wavelengths to lower values. For instance, an x of about 0.005 to 0.01 is suitable for modulating in the c-band (1530-1565 nm).

When the structure illustrated in FIG. 17 is employed as a light sensor, the active medium 100 can be a light-absorbing medium such as germanium. During operation of the light sensor, the electronics apply a reverse bias across the active medium 100. When the active medium 100 absorbs a light signal, an electrical current flows through the active medium 100. As a result, an electrical current through the light-absorbing medium indicates receipt of a light signal. Additionally, the magnitude of the current can indicate the power and/or intensity of the light signal. Different active media can absorb different wavelengths and are accordingly suitable for use in a light sensor depending on the function of the light sensor. A light-absorbing medium that is suitable for detection of light signals used in communications applications includes, but are not limited to, germanium, silicon germanium, silicon germanium quantum well, GaAs, and InP. Germanium is suitable for detection of light signals having wavelengths in a range of 1300 nm to 1600 nm. In some instance, the electronics can be configured to operate a structure as shown in FIG. 17 as both a modulator and a light detector.

When the active component is included in a base device, the base 20 of the base device can serve as the base 102 of the active component, the light-transmitting medium 105 can be the same as and continuous with the light-transmitting medium 18, and the active medium 100 can serve as the light-transmitting medium 18. Alternately, the active medium 100 can be included on the base device in addition to the light-transmitting medium 18 and the one or more first waveguides on the base device can be optically aligned with the component waveguide 108. Additionally, the electrical conductors 112 can serve as the contact pads 64.

When the active component is included in an auxiliary device, the base 42 of the auxiliary device can serve as the base 102 of the active component, the light-transmitting medium 105 can be the same as and continuous with the light-transmitting medium 40, and the active medium 100 can serve as the light-transmitting medium 40. Alternately, the active medium 100 can be included on the auxiliary device in addition to the light-transmitting medium 40 and the one or more second waveguides on the base device can be optically aligned with the component waveguide 108. Additionally, the electrical conductors 112 can serve as the contact pads 64.

As discussed above, a module component can include or consist of a laser. Examples of a laser that can be included in a module component or that can serve as the module component includes the laser and/or system disclosed in U.S. patent application Ser. No. 12/215,693, filed on Jun. 28, 2008, now U.S. Pat. No. 7,658,552, entitled "Interface Between Light Source and Optical Component," and incorporated herein in its entirety.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:
1. A system, comprising:
  optical modules that each includes a different base, each optical module including one or more module waveguides on one of the bases,
  module waveguides from different modules being aligned such that the aligned module waveguides exchange light signals,
  a first one of the modules having a recess extending into the base of the first module and a second one of the modules being received in the recess with at least a portion of one of the aligned module waveguides being between the base of the first module and the base of the second module;
  first electronics that operate a transmitter on one of the optical modules so as to generate one of the light signals; and
  second electronics that operate a receiver on another one of the modules such that the electronics generate an electrical signal in response to the receiver receiving one of the light signals.
2. The system of claim 1, wherein the light signal generated by the transmitter is the light signal received at the receiver.
3. The system of claim 1, wherein the first electronics modulate the light signal generated by the transmitter.
4. The system of claim 3, wherein the receiver receives the modulated light signal.

5. The system of claim 4, wherein the modulated light signal carries data included in an electrical signal that the first electronics employ to modulate the light signal generated by the transmitter.

6. The system of claim 1, wherein the aligned module waveguides each extends upwards from the base of one of the modules and at least a portion of each of the aligned module waveguides is between the bases from which the aligned waveguides extend.

7. The system of claim 1, wherein one of the modules includes a module waveguide that routes the light signal generated by the transmitter directly from the module that includes the transmitter to the module that includes the receiver.

8. The system of claim 1, wherein the first electronics are positioned on a first circuit board and the second electronics are positioned on a second circuit board.

9. The system of claim 1, wherein the module that includes the transmitter includes a modulator that receives the light signal from the transmitter.

10. The system of claim 9, wherein the first electronics operate the modulator so as to modulate the light signal received from the transmitter.

11. The system of claim 10, wherein the modulated light signal is received at the receiver.

12. The system of claim 10, wherein the modulated light signal carries data included in an electrical signal that the electronics employ to modulate the light signal received from the transmitter.

13. The system of claim 1, wherein the transmitter has a first optical path that one of the light signals travels through the transmitter and the receiver has a second optical path that one of the light signals travels through the receiver, and
    an entire length of the first optical path and an entire length of the second optical path are co-planar parallel to an optical path through each of the module waveguides.

14. The system of claim 1, wherein the recess is positioned at an edge of the first module such that the recess extends into a lateral side of the first module.

15. The system of claim 1, wherein an outermost perimeter of the first module includes a first lateral side between a first top side and a first bottom side, and the recess extends into the first lateral side.

16. The system of claim 1, wherein at least one waveguide between the base of the first module and the base of the second module terminates at a facet that is perpendicular to the first base.

17. The system of claim 1, wherein the waveguide between the base of the first module and the base of the second module is partially defined by a first ridge of a first light-transmitting medium that extends away from slab regions of the first light-transmitting medium, the first light-transmitting medium having a bottom between a top of the first ridge and the base of the first module;
    the waveguide between the base of the first module and the base of the second module is aligned with a second module waveguide located on the second module, the second module waveguide being partially defined by a second ridge of a second light-transmitting medium that extends away from slab regions of the second light-transmitting medium, the second light-transmitting medium having a bottom between a top of the second ridge and the base of the second module; and
    the top of the first ridge is further from the base of the first module than the top of the second ridge.

18. The system of claim 1, wherein modules are arranged such that an imaginary line perpendicular to a surface of the first base can extend through a bottom of the recess, the second module, and the waveguide located between the base of the first module and the base of the second module.

19. The system of claim 1, wherein the base of the first module includes a light insulator and a substrate arranged such that the light insulator is between the substrate and a module waveguide on the first module, the recess extending into the substrate.

20. The system of claim 19, wherein stops extend upwards from the bottom of the recess and are received in alignment recesses on the second module.

\* \* \* \* \*